(12) United States Patent
Schultz

(10) Patent No.: US 9,815,495 B2
(45) Date of Patent: Nov. 14, 2017

(54) WHEEL SUSPENSION WITH A VIRTUAL STEERING AXLE

(71) Applicant: BENTELER Automobiltechnik GmbH, Paderborn (DE)

(72) Inventor: Erik Schultz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/189,482

(22) Filed: Jun. 22, 2016

(65) Prior Publication Data
US 2016/0375934 A1     Dec. 29, 2016

(30) Foreign Application Priority Data

Jun. 23, 2015   (DE) .................. 10 2015 110 036

(51) Int. Cl.
| | | |
|---|---|---|
| *B62D 17/00* | (2006.01) | |
| *B60G 7/00* | (2006.01) | |
| *B60G 21/05* | (2006.01) | |

(52) U.S. Cl.
CPC ............ *B62D 17/00* (2013.01); *B60G 7/008* (2013.01); *B60G 21/051* (2013.01); *B60G 2200/132* (2013.01); *B60G 2200/21* (2013.01); *B60G 2200/31* (2013.01); *B60G 2200/462* (2013.01); *B60G 2200/4622* (2013.01); *B60G 2204/148* (2013.01); *B60G 2204/418* (2013.01); *B60G 2204/43* (2013.01); *B60G 2206/50* (2013.01)

(58) Field of Classification Search
CPC ...... B62D 17/00; B60G 7/008; B60G 21/051; B60G 2200/31; B60G 2200/4622; B60G 2204/418; B60G 2206/50; B60G 2200/21; B60G 2200/462; B60G 2204/148; B60G 2200/132; B60G 2204/43
See application file for complete search history.

(56) References Cited

U.S. PATENT DOCUMENTS

| | | | | |
|---|---|---|---|---|
| 7,588,261 | B2 * | 9/2009 | Kawanobe ............ | B60G 7/008 280/124.116 |
| 7,914,019 | B2 * | 3/2011 | Jakob .................... | B60G 3/14 280/124.107 |
| 8,220,810 | B2 * | 7/2012 | Jakob .................... | B60G 3/14 280/124.116 |
| 8,342,547 | B2 * | 1/2013 | Gerrard ................. | B60G 3/26 280/124.128 |
| 2006/0082094 | A1 * | 4/2006 | Mosler .................. | B60G 3/14 280/124.116 |

FOREIGN PATENT DOCUMENTS

| | | |
|---|---|---|
| DE | 102008031123 | 1/2010 |
| DE | 102011013265 | 9/2012 |
| EP | 1757468 | 2/2007 |
| JP | 59018005 | 1/1984 |
| JP | 62050211 | 3/1987 |
| WO | WO 2004101298 | 11/2004 |

* cited by examiner

*Primary Examiner* — Drew J Brown
(74) *Attorney, Agent, or Firm* — Jacobson Holman, PLLC

(57) ABSTRACT

The present invention concerns a wheel suspension 5 for a torsion beam axle 1, whereby a wheel mount 8 rotates about a virtual steering axle 18 as a result of a cornering force. According to the invention, it is further provided that a wheel mount bracket 6 with a yielding element 11 is coupled to the end 4 of a longitudinally extending swing arm 3 of the torsion beam axle 1, so that an additional steering in positive toe occurs as a result of a lateral force effect.

11 Claims, 6 Drawing Sheets

WHEEL SUSPENSION WITH A VIRTUAL STEERING AXLE

BACKGROUND OF THE INVENTION

The present invention concerns a wheel suspension for a torsion beam axle of a motor vehicle according to the features in the preamble of Claim 1.

DESCRIPTION OF PRIOR ART

For a motor vehicle axle, a torsion beam axle is known from the state of the art that exhibits a transverse pipe with longitudinally extending swing arms disposed on the transverse pipe. A wheel suspension is then coupled to the end of each longitudinally extending swing arm, so that, the longitudinally extending swing arm experiences a movement in vehicle the vertical is direction and causes torsion of the transverse pipe when the wheel is deflected.

A torsion beam axle is a rather simple design for a wheel suspension of a motor vehicle. To nonetheless improve the handling of the motor vehicle equipped with a torsion beam axle, it is known from the state of the art to elastokinematically design the wheel suspension in such a way that an additional setting of the wheel in negative camber and/or steering in positive toe is produced in response to a cornering force and/or braking force acting on the wheel. To do this a wheel mount pivots about a virtual steering axle. This is known from DE 10 2011 013 265 A1, for example.

DESCRIPTION OF THE INVENTION

The task of the present invention is therefore to further develop this type of wheel suspension based on the state of the art in such a way that improved handling characteristics, in particular steering in positive toe, can be observed.

The aforementioned task is inventively solved with the features of claim 1.

Advantageous design variants of the present invention are the subject matter of the dependent claims.

The wheel suspension for a torsion beam axle of a motor vehicle exhibits a wheel mount, whereby the wheel mount is elastokinematically coupled to a wheel mount bracket in such a way that the wheel mount pivots about a virtual steering axle toward positive toe in response to a cornering force and/or braking force acting on the wheel disposed on the wheel mount. The elastokinematic coupling is formed by three bearings, whereby at least two of the bearings are elastic bearings and one additional bearing exhibits at least one degree of freedom. The torsion beam axle itself exhibits a transverse pipe and two longitudinally extending swing arms extending from it, whereby one wheel mount bracket is respectively coupled to one end of a longitudinally extending swing arm. According to the invention, the wheel suspension is distinguished by the fact that a yielding element is integrated between the wheel mount bracket and the longitudinally extending swing arm in the area of an in vehicle longitudinal direction front elastic bearing.

Pivoting toward positive toe occurs during cornering, i.e. by the exertion of a cornering force on the wheel as a result of negative caster, which arises between the virtual steering axle and the wheel contact point. Steering in positive toe occurs during a braking procedure as the result of a negative scrub radius.

The elastic bearings are in particular solid rubber bearings, in particular rubber metal bearings, which can be configured both as sleeve bearings and as disc bearings.

There are two in the vehicle vertical direction lower bearings, whereby one bearing is disposed in the front with respect to the vehicle longitudinal direction and another bearing is disposed in the rear, in each case with respect to a center of the wheel. The two lower bearings are configured in such a way that an instantaneous center of rotation formed by them lies outside the vehicle, so that, together with an upper bearing with at least one degree of freedom, the instantaneous center of rotation forms the virtual steering axle. The upper bearing can also be an elastic bearing, in particular also a solid rubber bearing. It can, however, also be a ball joint. It is also conceivable that the additional bearing, in particular the upper bearing, is a solid structure that deforms elastically.

The yielding element is in particular configured as a support plate. The support plate is in particular a single-layer transverse baffle with a recess, which is in particular configured as an elongated hole or as a notch extending from the side. The support plate can also be configured as a clasp plate. As a result of its structure as a clasp plate, or as a result of the recess, the support plate exhibits flexibility. During operation, when a force is applied, it undergoes elastic deformation. The yielding element is therefore such a structural weakening that it does not form a rigid connection between the wheel mount bracket and the end of the longitudinally extending swing arm, but instead deforms elastically. Thus the yielding element is in particular a metallic, in particular steel, component. The yielding element is in particular configured as a sheet metal part and welded to the end of the longitudinally extending swing arm and the wheel mount bracket.

The elastic flexibility is directed in particular in the vehicle transverse direction, whereby the flexibility is caused by elastic material deformation as a result of the application of a force. In particular in connection with the flexibility in the vehicle transverse direction, this application of a force has the advantage that an elastic deformation is elicited specifically in particular only under the influence of the cornering force. The yielding element does not deform under the influence of the braking force. Thus, due to the yielding element, additional steering in positive toe occurs during cornering, but there is no additional steering in positive toe during a braking procedure. This allows the positive toe variation under the effect of a lateral force and a braking force, which occurs during the operation of the vehicle, to be adjusted selectively and independently of each other. This improves the handling characteristics and minimizes tire wear. The camber variation of the wheel at a constant toe variation, in particular, is thereby reduced through the elastic deformation of the yielding element. The advantages here are the same as mentioned above. It is particularly preferred that the yielding element for this purpose is configured to be softer than the elastic bearing disposed in the area of the yielding element.

The wheel mount bracket is otherwise connected with the end of the longitudinally extending swing arm in a particularly rigid manner. Preferably, there is a coupling point of the wheel mount bracket with the end of the longitudinally extending swing arm in the direct or indirect vicinity of each bearing. This results in particular in two coupling points at the upper and the rear bearing, which are respectively coupled rigidly with the ends of the longitudinally extending swing arms, and the coupling point in the form of the yielding element on the front bearing.

Another solution of the aforementioned task provides a wheel suspension for a torsion beam axle of a motor vehicle, whereby a transverse pipe is configured with longitudinally extending swing arms extending from the transverse pipe, whereby a wheel mount bracket is respectively coupled to one end of the longitudinally extending swing arms and a wheel mount is elastokinematically coupled to the wheel mount bracket, so that in response to a cornering force and/or braking force acting on a wheel disposed on the wheel mount, the wheel mount pivots about a virtual steering axle toward positive toe, whereby the elastokinematic coupling is formed by at least two elastic bearings and one additional bearing with at least one degree of freedom. This is characterized in that the wheel mount bracket is configured as a sheet metal part and, with respect to the driving direction, is coupled only with one upper and rear rigid coupling point to the end of the longitudinally extending swing arm, so that, in response to a cornering force on the wheel, the sheet metal part is deformed elastically in vehicle transverse direction and causes a positive toe variation.

The wheel mount bracket is in particular configured as a sheet-metal shell component, particularly preferably as a single-layer sheet-metal shell. This sheet-metal shell is rigidly, in particular via thermal joining, coupled with the end of the longitudinally extending swing arm at an, with reference to the center of the wheel, upper and rear coupling point. The in driving direction front end of the wheel mount bracket is thus freely positioned in the space and is here coupled to the wheel mount via an elastic bearing. If the wheel now experiences a cornering force, this cornering force exerts a force on the wheel mount in vehicle transverse direction, which is transmitted to the wheel mount bracket via the elastokinematic bearing. Since the wheel mount bracket happens to not exhibit any support or coupling to the end of the longitudinally extending swing arm or the longitudinally extending swing arm itself in the front area, this in turn causes a deflection or elastic deformation of the wheel mount bracket, which in turn causes a positive toe rotation of the wheel. This too significantly improves the handling characteristics of the motor vehicle equipped with a torsion beam axle according to the invention, because it allows the outer wheel of the rear axle to be steered in positive toe during cornering. However, with the exception of the elastokinematic coupling between the wheel mount bracket and the wheel mount, no additional effect can be observed when a braking force is exerted on the wheel.

All the above mentioned designs and advantages also apply analogously for the second design variant. The upper and rear coupling points in particular are respectively disposed in direct proximity to the upper and rear elastic bearing between the end of the longitudinally extending swing arm and the wheel mount bearing. These are essentially rigid thermal joints, in particular welded joints. They are also elastically deformable to a minor degree, however, so that, especially due to the lack of a front support, there is no crack formation or fatigue failure to be observed.

BRIEF DESCRIPTION OF THE DRAWINGS

Other advantages, features, characteristics and aspects of the present invention are the subject matter of the following description. Preferred design variants are shown in the schematic figures. The purpose is to provide a straightforward understanding of the invention. The figures show.

DETAILED DESCRIPTION OF THE INVENTION

The same reference numbers are used for the same or similar components in the figures, even if, for reasons of simplification, there is no repeated description.

Figure 1:
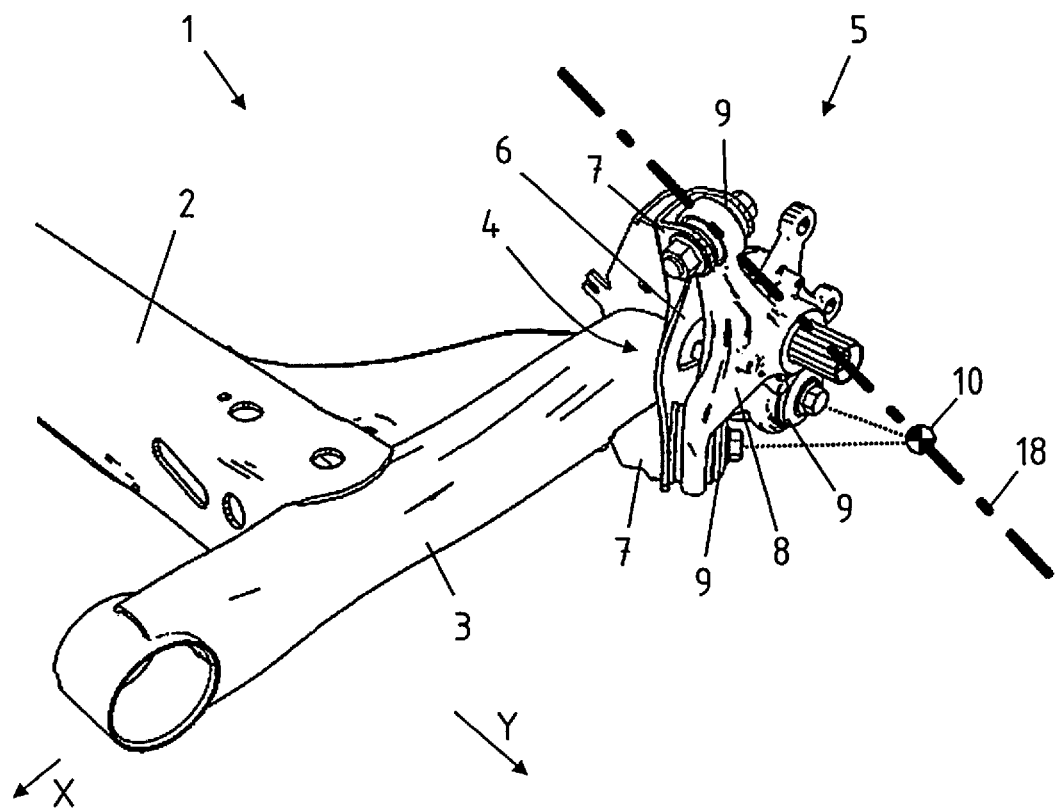
FIG. 1 a partial perspective view of a torsion beam axle with a virtual steering axle known from the state of the art.

FIG. 1 shows a perspective view of a torsion beam axle 1 according to the invention. It exhibits a transverse pipe 2 that extends in vehicle transverse direction Y. Longitudinally extending swing arms 3, which extend in vehicle longitudinal direction X, are disposed on the transverse pipe 2. A wheel suspension 5 is shown on one end 4 of the longitudinally extending swing arm 3, whereby a wheel mount bracket 6 is rigidly coupled with the end 4 of the longitudinally extending swing arm 3 via coupling points 7. With reference to the plane of the drawing, the rear coupling point is not visible, but does exist. The wheel mount 8 itself is in turn elastokinematically coupled with the wheel mount bracket 6 via elastic bearings 9, here in the form of three rubber metal bearings. The two, with reference to the plane of the drawing, lower elastic bearings 9 exhibit an externally located instantaneous center of rotation 10, which then forms a virtual steering axle 18 with the upper elastic bearing 9. Under the influence of a lateral force and/or a braking force, the wheel, which is mounted on the wheel mount 8 but is not shown in greater detail, then performs a rotation toward positive toe and/or negative camber.

Figure 2:
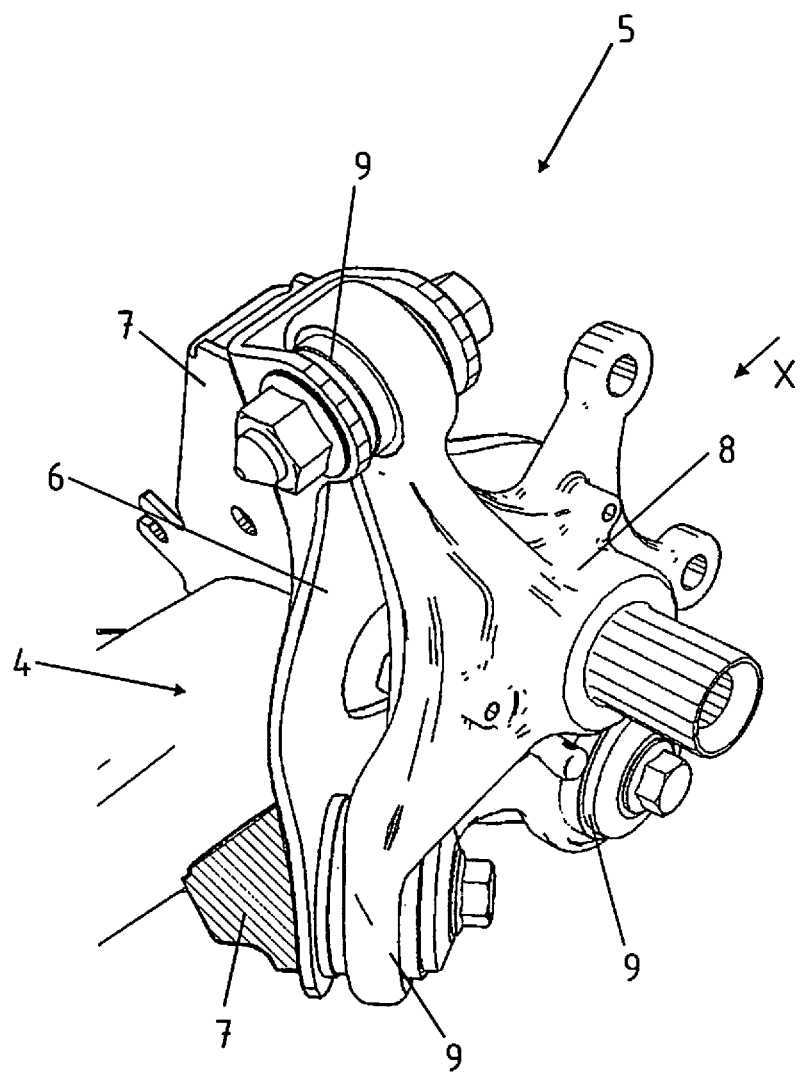
FIG. 2 the wheel suspension according to FIG. 1 in an enlarged view.

The wheel suspension 5 is shown again in detail in FIG. 2. It can clearly be seen that the, in vehicle longitudinal direction X, front coupling point 7 is coupled with the end 4 of the longitudinally extending swing arm 3 as a support plate. A weld joint, which is not shown in more detail, is in particular configured for this purpose. The upper coupling point 7 and the, with reference to the plane of the drawing, rear coupling point 7, which is not visible behind the wheel mount bracket, are accordingly configured as a sheet metal part with welded joints, so that in each case there is a rigid coupling with the end 4 of the longitudinally extending swing arm 3.

Figure 3:
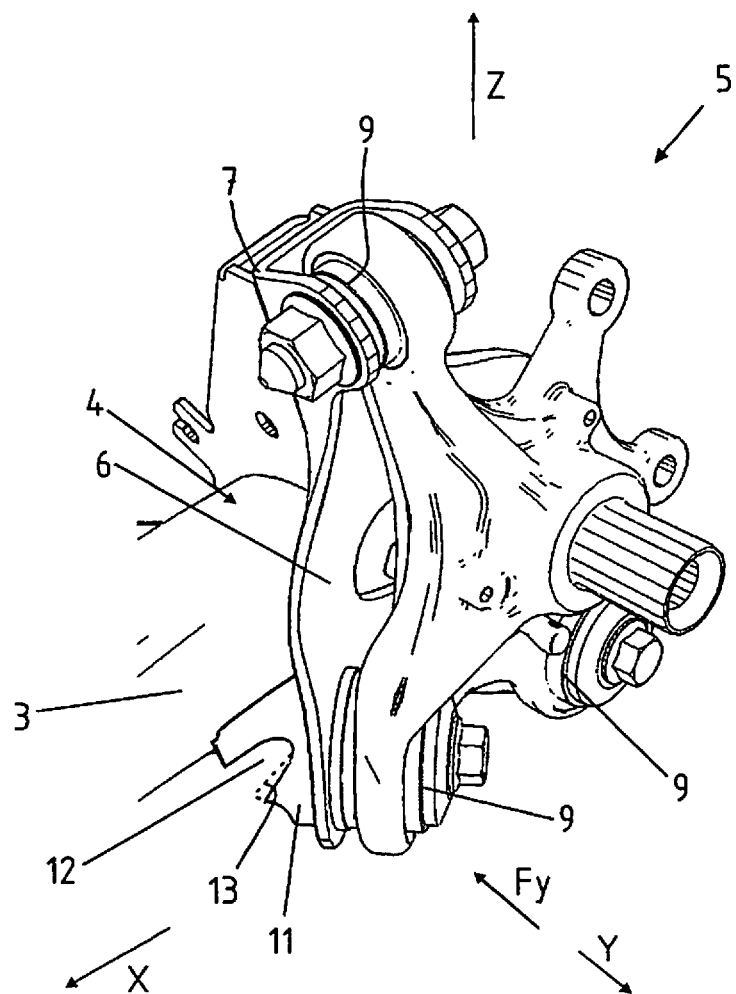
FIG. 3 a partial view with the yielding element according to the invention.

FIG. 3 shows an inventive design variant of the wheel suspension 5. The front coupling point here is configured in the form of a yielding element 11 with a recess 12. If a lateral force Fy is applied, which can occur in the form of a lateral force effect on the wheel that is not shown in more detail for example, the front coupling point 7 is configured in the form of yielding element 11 with a recess 12. The yielding element 11 deforms in the area of the recess 12, illustrated with the dotted line 13, so that the wheel mount bracket, the wheel mount 8 and the wheel coupled to it are together rotated toward positive toe. The virtual steering axle 18, in particular, is displaced in such a way that a more pronounced steering in positive toe results.

Figure 4A:
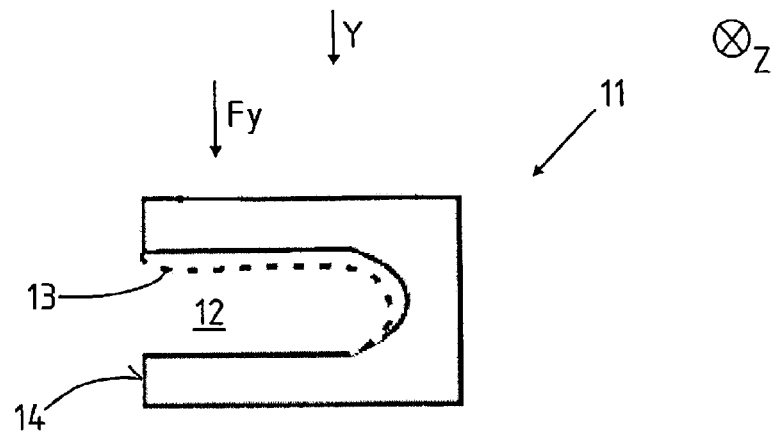
FIG. 4 consisting of FIGS. 4A-4C showing different design variants of the yielding element according to the invention in plan view.

FIG. 4 shows different design variants of the yielding element 11 in plan view seen from the vehicle vertical direction Z. According to FIG. 4A, a lateral recess 12 extending from the outer edge 14 is configured in the form of an elongated cut out. If a lateral force Fy is applied in the vehicle transverse direction Y, the yielding element 11 experiences an elastic deformation in the direction toward the dotted line 13.

This corresponds in particular to the configuration of a yielding element 11 in the form of a single-layer transverse baffle, whereby the plane of the baffle extends substantially in the vehicle transverse direction Y. The yielding element 11 can be made of a steel alloy, but also of a light metal alloy.

Figure 4B:
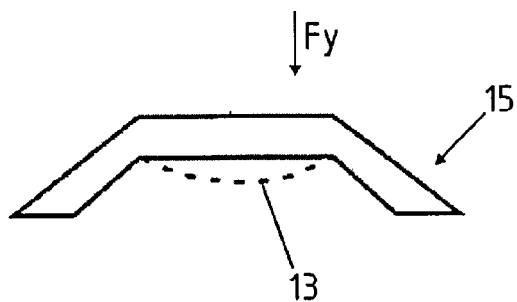

An alternative design variant is shown in FIG. 4B, in which the yielding element is configured as a clasp component or a clasp plate 15. It exhibits an essentially C-shaped contour, which likewise deforms elastically under the influence of a lateral force Fy in the direction of the dotted line 13. An elastic bearing 9, coupled in direct proximity with it, would thus be rotated inward in vehicle transverse direction Y, and steering in positive toe would occur as a result.

Figure 4C:
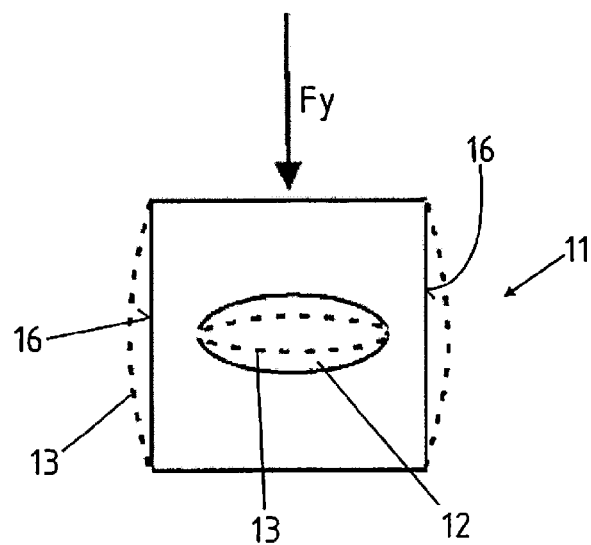

FIG. 4C shows another design variant of the yielding element 11 in the form of a single-shell support plate. Here too a aperture 12 is provided in the shape of an elliptical hole or an elliptically shaped elongated hole, which is, however, formed in the inner part. Under the influence of an applied lateral force Fy, the recess 12 is deformed toward the dotted line 13, and the side areas 16 of the yielding element 11 likewise deform toward the dotted line 13 as shown.

Figure 5:
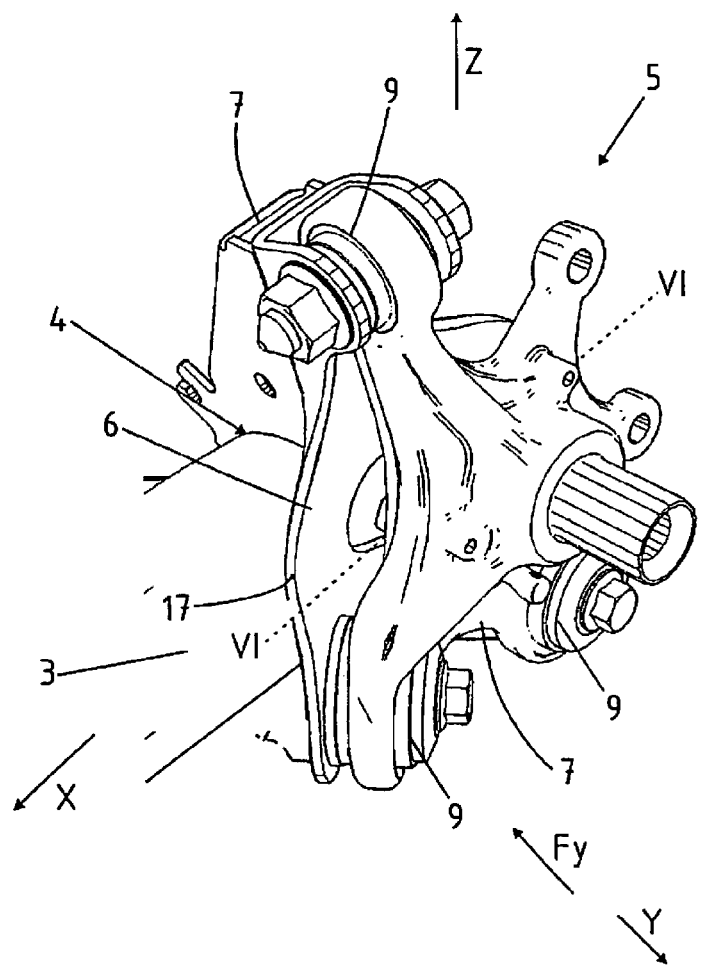
FIG. 5 a further detailed view of a wheel suspension without a front support element FIG. 6 a plan view onto the wheel mount bracket according to FIG. 5 and FIG. 7 consists of FIGS. 7A and 7B showing a torsion beam axle according to the invention in a view from the rear and a plan view.
Figure 6:
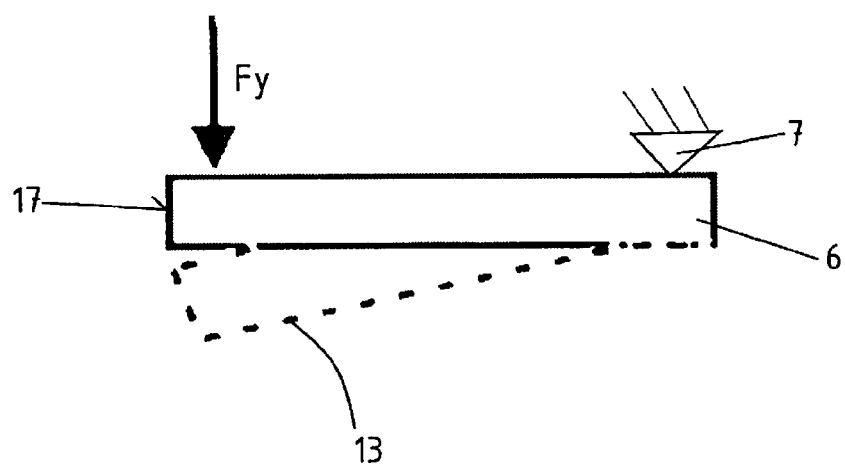

FIG. 5 shows a further design variant of the wheel suspension 5, whereby, in contrast to FIG. 3 or FIG. 2, the front coupling point 7 or the yielding element 11 are left out completely. The wheel mount bracket 6 is therefore configured as a single-shell sheet metal part. This wheel mount bracket is thus shown rigidly coupled with the end 4 of the longitudinally extending swing arm 3 at the, with reference to the upper plane of the drawing, upper coupling point 7 as well as at the rear coupling point, which is not shown in more detail. A schematic top view along the section line VI-VI of FIG. 5 is further shown in FIG. 6. FIG. 6 shows a plan view of the wheel mount bracket 6, which is coupled to the rear coupling point 7 in a rigid and in particular also torsion-proof manner, as well as to the upper coupling point that is not shown in more detail. As a result of the influence of a lateral force Fy, the entire wheel mount bracket 6 is elastically deformed, in particular in the area of a, with respect to the driving direction, front edge 17, so that this front edge is also deformed toward the dotted line 13 and the front elastic bearing 9, which is not shown in more detail, is moved inward in vehicle transverse direction Y, so that the wheel coupled to it is rotated toward positive toe.

Figure 7A:
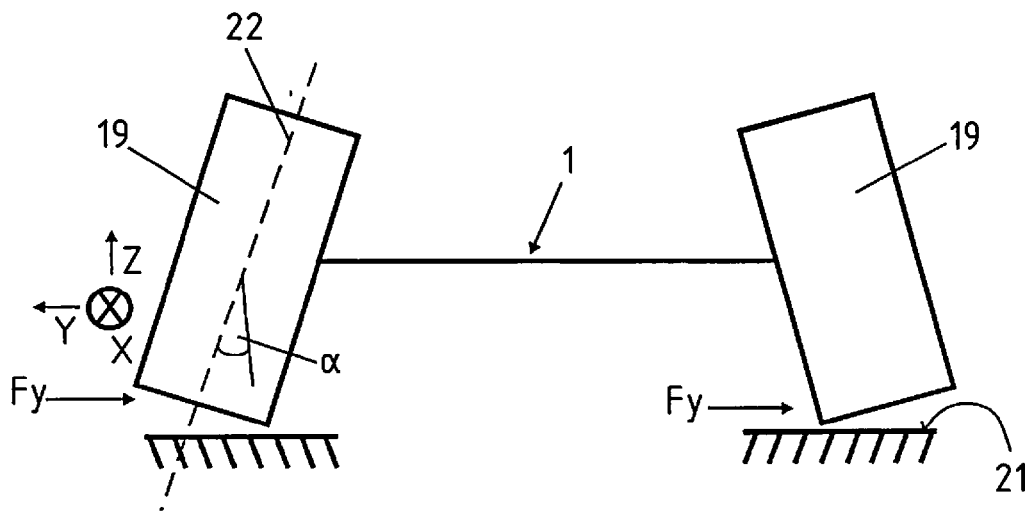
Figure 7B:
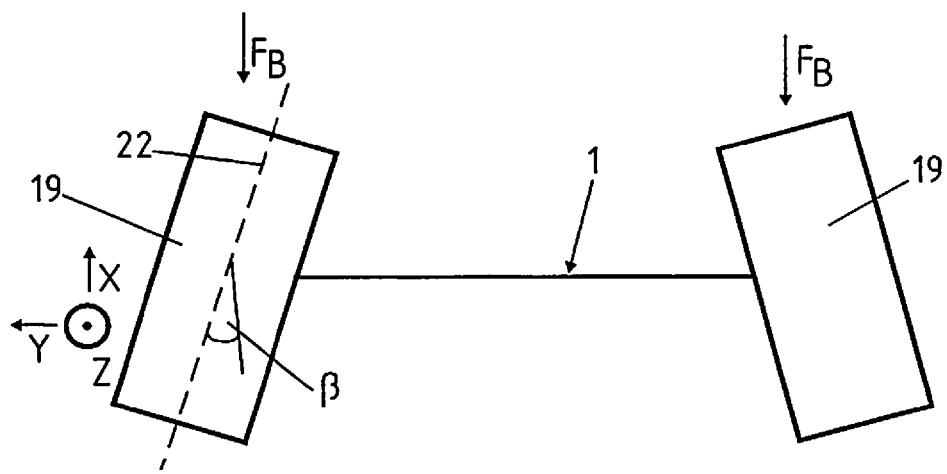

FIGS. 7A and B show a particular torsion beam axle 1 with two wheels 19 in a view from the rear or in FIG. 7B in a plan view from above.

According to FIG. 7A, a torsion beam axle 1 according to the invention is shown. On each side this torsion beam axle exhibits a wheel 19. The wheels 19 are resting on a road surface 21. The vehicle is moving with the driving direction in vehicle longitudinal direction X into the plane of the drawing. The torsion beam axle 1 is thus shown in a view from the rear.

Further shown is the application of the lateral force Fy to the wheels 19, for example when driving a right-hand turn according to FIG. 7A.

The result is a camber angle α between a longitudinal section axis 22 of the wheel 19 and the vehicle vertical direction Z. Negative camber is shown here.

FIG. 7B shows the torsion beam axle 1 in a view from above. The wheels 19 exhibit a toe angle β to the vehicle longitudinal direction X; shown is positive toe. Also shown is a braking force FB acting on the wheels 19.

REFERENCE SIGNS

1—torsion beam axle
2—transverse pipe
3—longitudinally extending swing arm
4—end to 3
5—wheel suspension
6—wheel mount bracket
7—coupling point
8—wheel mount
9—elastic bearing
10—instantaneous center of rotation
11—yielding element
12—recess
13—dotted line
14—outer edge
15—clasp plate
16—side area
17—front edge
18—virtual steering axle
19—wheel
20—toe
21—road surface
X—vehicle longitudinal direction
Y—vehicle transverse direction
Z—vehicle vertical direction
FB—braking force
Fy—lateral force
α—camber angle
β—toe angle

The invention claimed is:

1. A wheel suspension for a torsion beam axle of a motor vehicle, containing a wheel mount, the wheel mount is elastokinematically coupled to a wheel mount bracket in such a way that the wheel mount pivots about a virtual steering axle toward positive toe in response to a cornering force and/or braking force acting on a wheel connected to the wheel mount, whereby the elastokinematic coupling is formed by at least two elastic bearings and one additional bearing with at least one degree of freedom and the torsion beam axle consists of a transverse pipe and two longitudinally extending swing arms extending along it, whereby a wheel mount bracket is respectively coupled to one end of the longitudinally extending swing arm, wherein a yielding element is a support plate which is a single-layer transverse baffle with a recess and is integrated between the wheel mount bracket and the longitudinally extending swing arm in the area of a vehicle longitudinal direction (X) front elastic bearing.

2. The wheel suspension according to claim 1, wherein the recess is an elongated hole.

3. The wheel suspension according to claim 1, wherein the yielding element exhibits an elastic flexibility in a vehicle transverse direction (Y), whereby the flexibility is caused by elastic material deformation as a result of the application of a force.

4. The wheel suspension according to claim 1, wherein, with integration of the yielding element as well as at least one rigid coupling point, the wheel mount bracket is coupled to the end of the longitudinally extending swing arm.

5. The wheel suspension according to claim 4, wherein two rigid coupling points are provided, whereby, with respect to the driving direction, one coupling point is disposed at the top on the wheel mount bracket and one coupling point is a rear coupling point.

6. The wheel suspension according to claim 1, wherein the elastic bearings are solid rubber bearings.

7. The wheel suspension according to claim 6, wherein the elastic bearings (9) are rubber metal bearings.

8. The wheel suspension according to claim 6, wherein the elastic bearings are rubber metal disc bearings.

9. A wheel suspension for torsion beam axle of a motor vehicle, containing a wheel mount, the wheel mount is elastokinematically coupled to a wheel mount bracket in such a way that the wheel mount pivots about a virtual steering axle toward positive toe in response to a cornering force and/or braking force acting on a wheel connected to the wheel mount, whereby the elastokinematic coupling is formed by at least two elastic bearings and one additional bearing with at least one degree of freedom and the torsion beam axle consists of a transverse pipe and two longitudinally extending swing arms extending along it, whereby a wheel mount bracket is respectively coupled to one end of the longitudinally extending swing arm, wherein a yielding element is integrated between the wheel mount bracket and the longitudinally extending swing arm in the area of a vehicle longitudinal direction (X) front elastic bearing, and the yielding element is deformed only under the effect of the cornering force.

10. The wheel suspension according to claim 9, wherein the yielding element is not deformed by the effect of a braking force.

11. A wheel suspension for a torsion beam axle of a motor vehicle, containing a wheel mount, the wheel mount is elastokinematically coupled to a wheel mount bracket in such a way that the wheel mount pivots about a virtual steering axle toward positive toe in response to a cornering force and/or braking force acting on a wheel connected to the wheel mount, whereby the elastokinematic coupling is formed by at least two elastic bearings and one additional bearing with at least one degree of freedom and the torsion beam axle consists of a transverse pipe and two longitudinally extending swing arms extending along it, whereby a wheel mount bracket is respectively coupled to one end of the longitudinally extending swing arm, wherein a yielding element is a support plate integrated between the wheel mount bracket and the longitudinally extending swing arm in the area of the vehicle longitudinal direction (X) front elastic bearing and the support plate is configured as a clasp plate.

* * * * *